FIP8102 XR 3,732,496
SR

United States Patent [19] Boyer

[11] 3,732,496
[45] May 8, 1973

[54] RADIO TRANSMITTER-RECEIVED INCLUDING MEANS FOR AUTOMATICALLY ADJUSTING THE TRANSMISSION LEVEL

[75] Inventor: Marcel Louis Boyer, Chatillon, France

[73] Assignee: C.I.T.-Compagnie Industrielle Des Telecommunication, Paris, France

[22] Filed: Oct. 5, 1970

[21] Appl. No.: 78,100

[30] Foreign Application Priority Data

Oct. 3, 1969 France..........................6933910

[52] U.S. Cl. .......................325/62, 343/177, 325/15, 325/64

[51] Int. Cl. ..............................................H04b 1/62

[58] Field of Search....................325/15, 21, 62, 183; 343/6.5 R, 6.5 LC, 6.5 SS, 7.5, 177

[56] References Cited

UNITED STATES PATENTS

| | | | |
|---|---|---|---|
| 2,678,998 | 5/1954 | Young, Jr. | 343/177 |
| 3,415,952 | 12/1968 | Blackburn et al. | 325/62 X |
| 3,577,080 | 5/1971 | Cannalte | 325/183 |
| 1,658,856 | 2/1928 | Potter | 325/62 X |

*Primary Examiner*—Benedict V. Safourek
*Attorney*—Craig, Antonelli, Stewart and Hill

[57] ABSTRACT

A radio transmitter-receiver including means for automatically adjusting the transmission level so as to bring the reception level in an associated transmitter-receiver receiving such transmission into a range limited at a lower end by a reference reception level by means of an attenuator providing a stepped variable attenuation level and controlled by a signal frequency received from the associated transmitter-receiver; and means for transmitting a signal frequency selected from a set of such frequencies in accordance with the level at which a transmission from the associated transmitter-receiver is received by means of a selector device comprising a set of threshold circuits corresponding to thresholds between said reference reception level and a saturation level limiting the range at an upper end.

20 Claims, 7 Drawing Figures

INVENTOR:
MARCEL LOUIS BOYER

BY Craig, Antonelli, Stewart & Hill
ATTORNEYS

RADIO TRANSMITTER-RECEIVED INCLUDING MEANS FOR AUTOMATICALLY ADJUSTING THE TRANSMISSION LEVEL

The present invention concerns the regulation of transmission level in radio communications.

More particularly, the present invention concerns automatic control arrangements for regulating the transmission level of at least one of a pair of communicating transmitter-receiver stations with the intention of providing a transmission level which is as low as possible while still ensuring adequate intellibility of reception. The invention is particularly, but not exclusively, applicable to radio communication between mobile transmitter-receiver stations.

In radio communications between two transmitter-receiver stations, it is essential that each station receives at a level which ensures an adequate intelligibility, that is to say, a signal to noise ratio which is sufficiently high. It is thus possible to define a reference transmission level P ensuring this. On the other hand, it is not only useless, but even disadvantageous for the transmission level to be significantly above this reference level P. Transmission at a much higher level involves a useless consummation of energy, which is particularly disadvantageous in mobile stations where the energy reserve available is often limited. Transmission at an excessive level increases the effect of the transmission on other communications taking place in the same frequency band or in bands harmonically related to it. In the case of military applications, the efficiency of tracking systems increases rapidly with increasing transmission level in the station being tracked.

In accordance with a first aspect of the invention, a radio transmitter-receiver includes a control arrangement for adjusting its level of transmission to another transmitter-receiver in accordance with a level signal received from that other transmitter-receiver and indicative of the level at which the transmission is received.

The transmitter-receiver preferably further includes a signalling arrangement for transmitting to another or the other transmitter-receiver a level signal significant of the level at which it receives a transmission from that other receiver.

In accordance with a second aspect of the invention, a radio transmitter-receiver includes a signalling arrangement for transmitting to another transmitter-receiver a level signal significant of the level at which it receives a transmission from that other receiver.

It is thus advantageous for at least one of a pair of transmitter-receiver stations to have its transmission level regulated in dependence on the level at which its transmission is received by the other station, and preferably both stations have their levels controlled in this way. The level signal indicative of the level at which a transmission is received is transmitted in conventional manner at the same time as the ordinary communication.

Each level signal suitably comprises a selected one of a set of signal frequencies each significant of a preselected range of reception levels.

The control arrangement suitably includes filter circuitry for identifying the signal frequency in a received level signal and a variable attenuator operable in response to the detection of a particular signal frequency to attenuate the transmission level by a predetermined amount associated with that frequency. The signalling arrangement suitably includes threshold circuitry connected to sample the instantaneous level at which the transmission from the other transmitter-receiver is received and adapted to provide an output significant of a preselected range in which the instantaneous level lies, and frequency selector circuitry arranged to select a signal frequency for transmission to the other transmitter-receiver in accordance with the threshold circuitry output.

The invention will now be described in more detail, by way of example only, with reference to the accompanying diagrammatic drawings, in which.

Figure 3A:
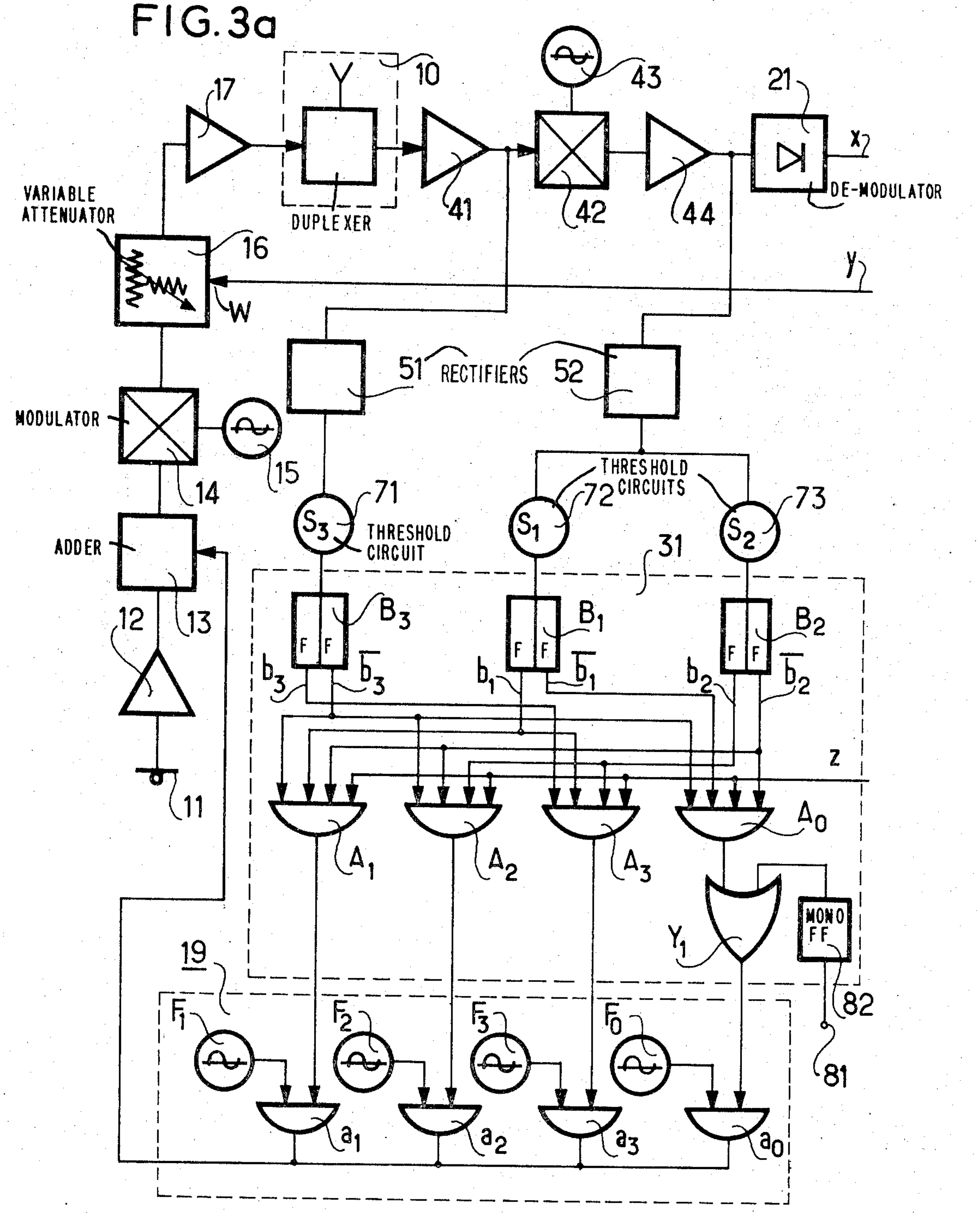
Figure 3B:
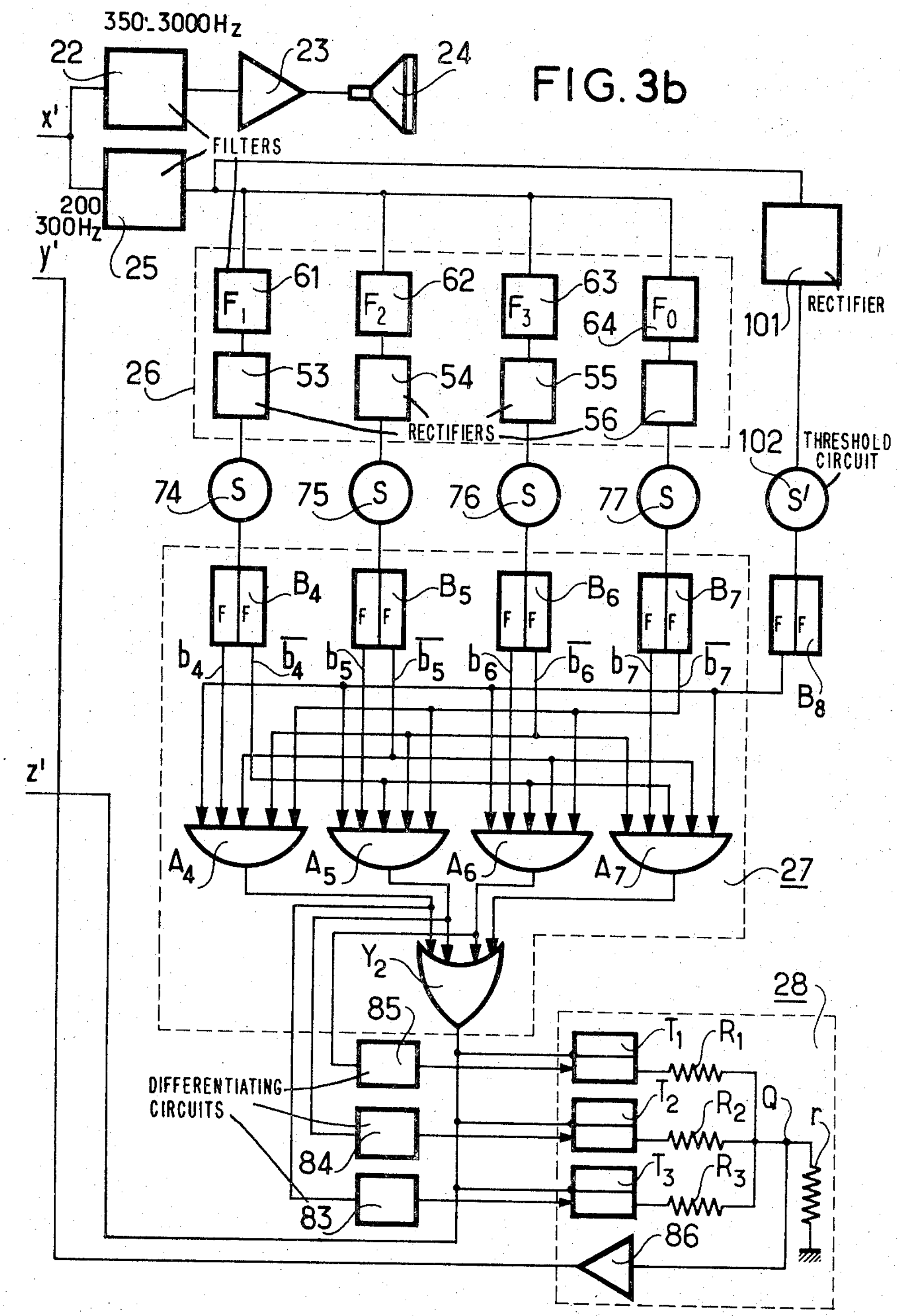
Figure 4:
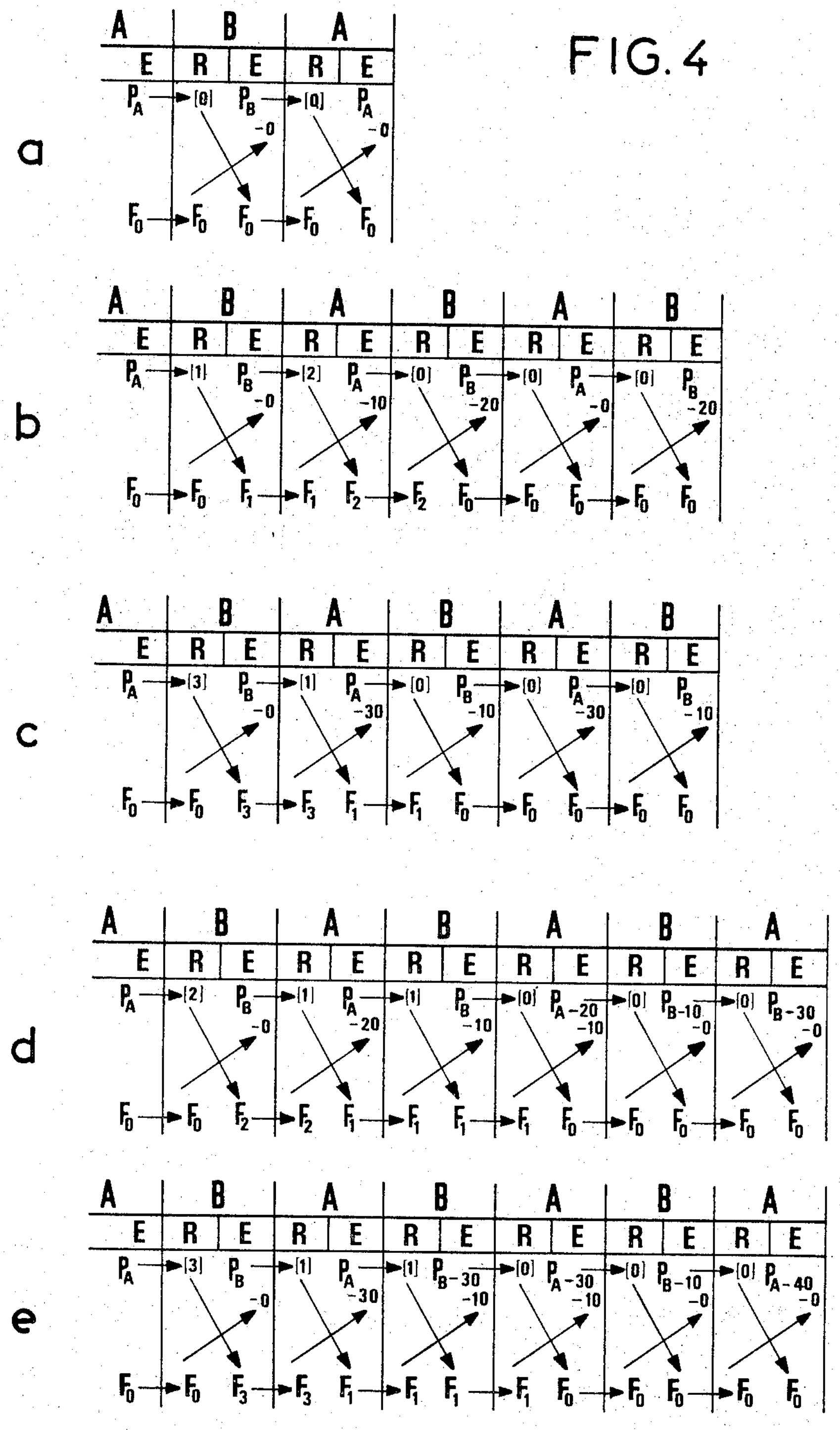
Figure 5:
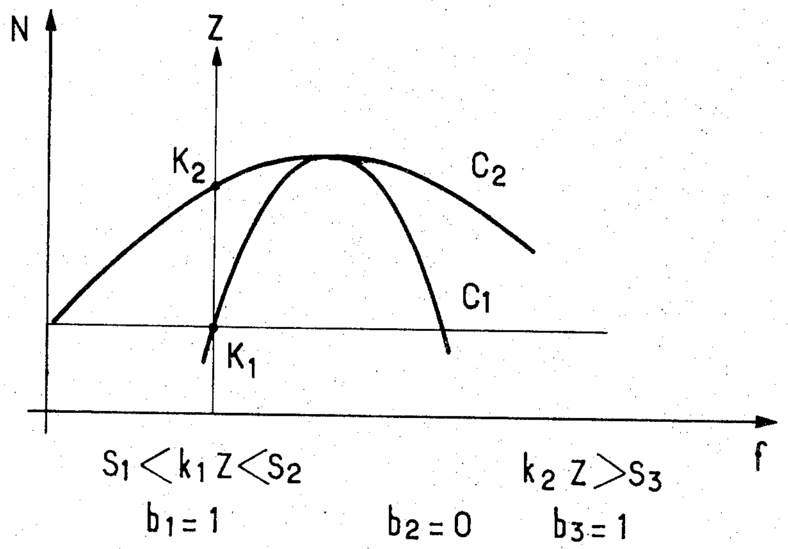
Figure 6:
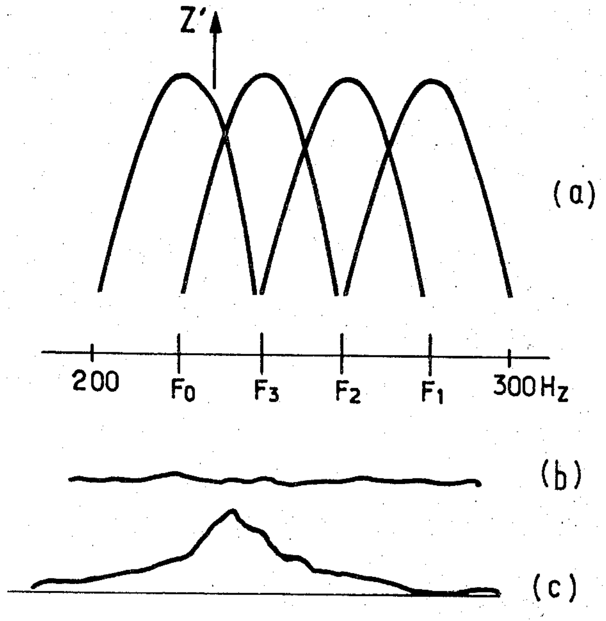

FIG. 3*a* and FIG. 3*b* together show a transmitter-receiver in more detail;

FIG. 4 is a table referred to in the description of the operation of the transmitter-receiver;

FIG. 5 is a diagram referred to in the description of a first method of reducing interference; and FIG. 6 is a diagram referred to in the description of a second way of avoiding interference.

Figures 1, 2:
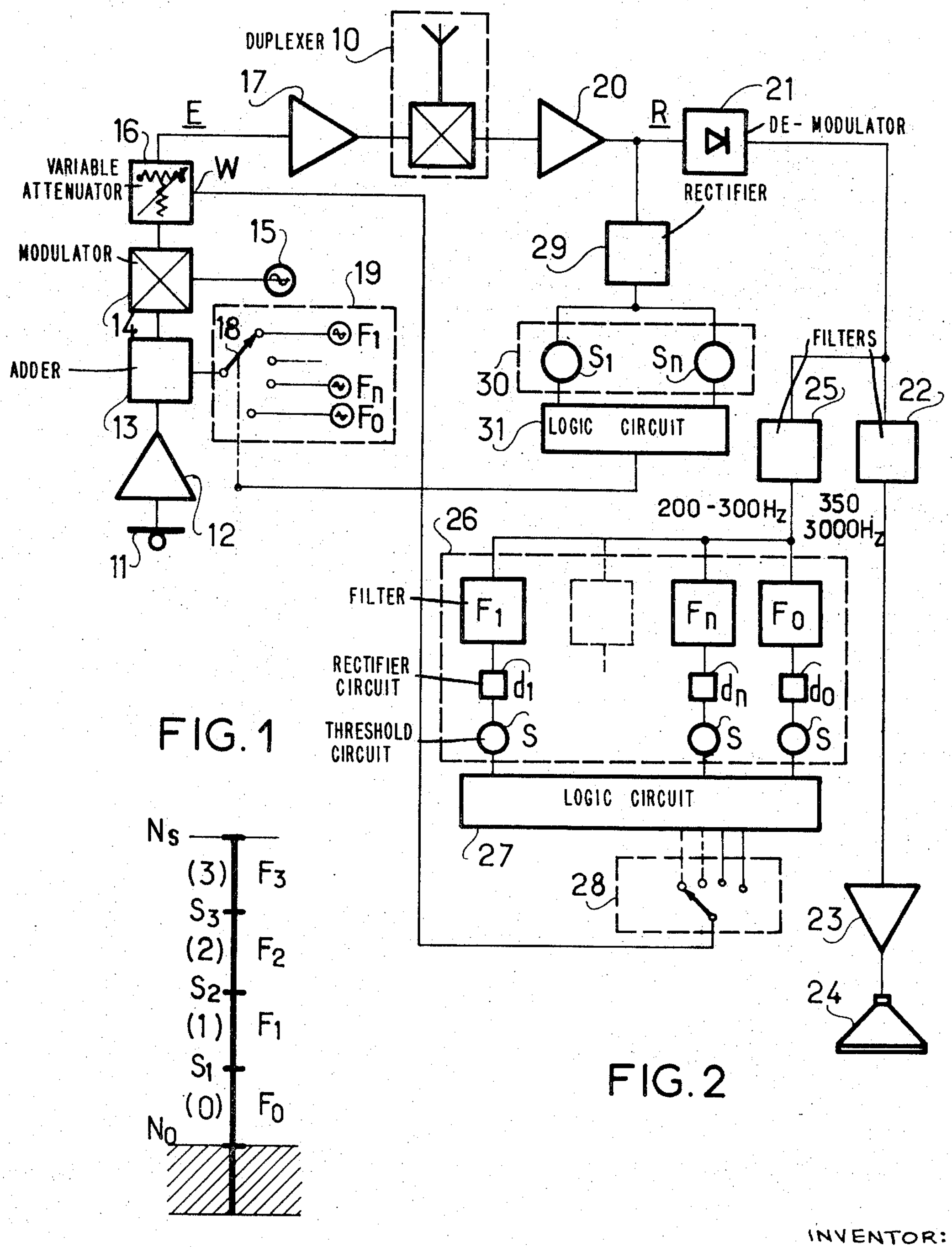
FIG. 1 shows a set of reception levels and associated level signals.
FIG. 2 is a simplified block diagram of a transmitter-receiver.

Referring to FIG. 1, a band of reception levels is divided into *n* ranges, where *n* is 4 in the present example. The band is limited at its lower end by a reference level $N_0$ below which the signal is not satisfactorily separable from the associated noise. At its upper end the band is limited by a saturation level $N_S$. The ranges are indicated (0), (1), (2), (3), in the order of increasing level, and are separated by three thresholds: $S_1$, $S_2$, $S_3$. A level signal is associated with each of the ranges, and each level signal comprises one of a set of signal frequencies $F_0$, $F_1$, $F_2$, $F_3$, each significant of one of the reception level ranges, as shown in FIG. 1.

When the signal frequency $F_3$ transmitted by one transmitter-receiver, which will be referred to as post A, is received by an associated transmitter-receiver, post B, the latter reduces its transmission level by a predetermined amount, for example by 30 decibels (dB). If the signal frequency $F_2$ is received by post B, the transmission level is reduced by a different predetermined amount, for example 20 dB. If it is the frequency $F_1$ which is received, the reduction in transmission level is still smaller, for example 10 dB. When the frequency $F_0$ is received, this indicates that the reception level is in the lowest range (0) which h the required one, so that there is no modification of the transmission level.

It will be appreciated that this process is identical for both transmitter-receivers in communication. The sequence of events just described for transmission from post A to post B is carried out in precisely the same way in the case of communication from post B to post A.

At the beginning of a regulation cycle, the two transmitter-receivers transmit at their maximal levels, $P_A$ and $P_B$ respectively. When the regulation is finished, the transmission levels of the two transmitter-receivers lie in the range (0), the two transmitter-receivers transmit a level signal consisting of the signal frequency $F_0$.

FIG. 2 is a simplified block diagram of a transmitter-receiver, illustrating the general case where the band of reception level is divided into $n$ ranges. In the example described with reference to FIG. 1, $n$ was equal to 4.

Referring to FIG. 2, the transmitter-receiver includes a transmitter section E and a receiver section R. These are linked to a common aerial and diplexer arrangement indicated diagrammatically at 10.

The transmitter includes a signal source, in the present example a microphone 11, connected to an amplifier 12 whose output is applied to one input of a summing element 13. This element 13 also receives a signal frequency and applies this frequency together with the signal from amplifier 12 to a modulator 14 which receives the carrier frequency from an oscillator 15. The modulator output is applied to a power amplifier 17 through a variable attenuator 16. The attenuator 16 has a control input W which receives a control signal for selecting one of a range of possible attenuation levels for each of a number of discrete voltages applied to the input W. In the present example, the attenuator 16 provides no attenuation when the voltage at input W is 0 and for three respective voltage levels applied at that input supplies attenuations of 10, 20 and 30 dB.

The signal frequency applied to summing elements 13 is obtained from an assembly 19 formed by $n$ fixed frequency oscillators each providing one of the signal frequencies $F_1 \ldots F_n$, $F_0$. The output of one of these $n$ oscillators is selected by a switching element 18 and applied to the summing element 13. The switching element 18 is controlled by an arrangement in the receiver section, as will be described fully below. The summing element 13 may be of any suitable known type, a differential transformer, for example, or an amplifier having two inputs.

The signal frequencies F lie in the modulation band, that is to say in the same frequency band as the signals to be transmitted, and in the case of vocal communications lie in the band of voice frequencies. Their modulation index is advantageously low, for example 10 percent at the maximum. They may lie at a lower end of the modulation band, just below the lower limit of the conventional telephone frequencies (300 Hz), for example in the band 200–300 Hz. Alternatively, these frequencies may be situated at the upper end of the modulation band and transmitted by double modulation by means of an auxiliary sub-carrier of, for example, 4,000 Hz. With this second solution, it is possible to obtain better protection against interference. The modulation may be of any type.

The receiver section R includes an input amplifier 20 whose output is fed to the input of a de-modulator 21 whose output is separated into two low frequency channels by respective filters 22 and 25. Filter 22 is a band-pass filter whose pass band is from 350 to 3,000 Hz. Filter 25 is a band-pass filter whose pass band is from 200 to 300 Hz. The output of filter 22 is applied to an audio frequency amplifier 23 and a loudspeaker or earpiece 24. This is the voice channel used for listening to a voice transmission from an associated transmitter-receiver.

The output of the filter 25 is applied to an assembly 26 which includes $n + 1$ filters whose inputs are connected in parallel to the output of filter 25. Each of these $n + 1$ filters is tuned to one of the set of level frequencies $F_1 \ldots, F_n$, $F_0$. Each is connected in series with a respective rectifier $d_1 \ldots d_n$, $d_0$ and a threshold circuit S. All these threshold circuits S have the same threshold value.

A logic circuit 27 has $n + 1$ inputs each connected to the output of a respective threshold circuit S. The logic circuit 27 provides at its output a set of voltages, one of which is applied by a switching element 28 to the input W of the variable attenuator 16 of the transmitter section. Each of these voltages corresponds to an attenuation level, and one voltage is 0 to provide no attenuation.

The switching element 28 is advantageously of the type with a memory, that is to say that during the course of a regulation process in several stages, when a greater level of attenuation is called for, one or more attenuation steps are added to the previously obtained attenuation level. If a smaller attenuation is required, there is a return to zero attenuation with corresponding transmission at maximal levels, and the regulation process restarts. The means carrying out this process will be described in more detail with reference to FIG. 3.

Where the number of discrete attenuation values required is relatively large, it is preferable to employ a limited number of level frequencies selecting the attenuation values by means of a coding and de-coding process carried out by the logic circuit 27 and an associated logic circuit 31 which will shortly be described. For example, ten attenuation values could be coded with only four signal frequencies.

To the output of the amplifier 20 is connected a rectifier circuit 29 providing at its output a direct current signal whose amplitude is significant of the reception level, for example of the level of the intermediate frequency before de-modulation. The output of the rectifier circuit 29 is connected to an assembly 30 consisting of $n$ threshold circuits with respective threshold values $S_1, S_2 \ldots, S_n$, in increasing order. The inputs of all these threshold circuits are connected in parallel to the output of rectifier circuit 29. Their outputs are connected to respective inputs of a logic circuit 31, whose output controls operation of the switching element 18 of the assembly 19 of the transmitter section of the transmitter-receiver.

Briefly, the operation of the transmitter-receiver is as follows:

The level signal picked up by the receiver section R is applied to the assembly 26 in which the corresponding signal frequency is identified. This frequency is significant of the level at which the transmission from transmitter section E is received by an associated transmitter-receiver. The logic circuit 27 controls the variable attenuator 16 as described with reference to FIG. 1 to reduce the transmission level until the level signal received incorporates the signal frequency $F_0$, indicating that the transmission level is in its lowest possible range. Thus the assembly 26 with its associated logic circuit 27 and switching element 28, together with the variable attenuator 16 make up a control arrangement for adjusting the transmission level in accordance with a level signal received and indicative of the level at which the transmission is picked up by an associated transmitter-receiver.

At the same time, the threshold circuit assembly 30 and logic circuit 31 control the switching element 18 to apply to the output of the transmitter section E one of the signal frequencies $F_1 \ldots, F_n, F_0$ significant of the level at which transmission from the associated transmitter-receiver is picked up. Thus the threshold circuitry 30, the logic circuit 31 and the switching element 18 of assembly 19 make up a signalling arrangement for transmitting to the associated transmitter-receiver a level signal significant of the level at which the transmission from that receiver is picked up. The filters of assembly 26 are suitably band-pass filters with a bandwidth of 10 Hz and are preferably active filters.

FIGS. 3*a* and 3*b* show together the transmitter-receiver in more detail. The lines referenced *x*, *y*, and *z* in FIG. 3*a* extend to the lines x', *y'* and *z'* of FIG. 3b, so that by placing FIGS. 3*a* and 3*b* side-by-side with these lines in alighment, the complete block diagram of the transmitter-receiver is seen. In FIG. 3, the elements which are identical to those of FIG. 2 carry the same reference numerals and will not be described again. In FIG, 3, the particular case $n = 3$ is shown, that is to say the band of reception levels is divided into four ranges and there are four signal frequencies $F_1$, $F_2$, $F_3$ and $F_0$. As well as showing the transmitter-receiver in more detail, FIG. 3 includes two modifications of the circuit of FIG. 2.

The transmitter section is identical to that of FIG. 2, but the receiver section comprises a radio frequency (RF) amplifier 41 connected to receive the signal from the aerial and duplexer arrangement 10. The output of this amplifier is applied to a frequency changer 42 with associated local oscillator 43. The frequency changer output is applied to the input of an intermediate frequency (IF) amplifier 44 whose output is connected to de-modulator 21 as in FIG. 2.

The low frequency channel including filter 22, amplifier 23 and loudspeaker or earpiece 24 is identical to that of FIG. 2, and the filter 25 has its output connected to the inputs of assembly 26 which includes a set of four filters 61, 62, 63 and 64 tuned to the signal frequencies $F_0$, $F_3$, $F_2$ and $F_1$, respectively. A respective threshold circuits 74-77 having a threshold rectifier 53, 54, 55 and 56 is connected in series with each of the filters 51 to 64. The rectifier outputs are connected to respective value S. The frequencies $F_1$, $F_2$, $F_3$ and $F_0$ are respectively 280 Hz, 260 Hz, 240 Hz and 220 Hz.

A rectifier circuit 51 is connected to the output of the RF amplifier 41. Its output is connected to a threshold circuit 71, whose threshold value is $S_3$, between reception level ranges (2) and (3) as shown in FIG. 1. A further rectifier circuit 52 is connected to the output of the IF amplifier 44, and its output is connected to the input of each of two threshold circuits 72 and 73, with respective threshold values $S_1$ and $S_2$, also as defined by FIG. 1.

The rectifiers 51 and 52 provide direct voltages significant of the RF and IF levels, and these signals may be used in automatic gain control circuitry if required. Alternatively, if the transmitter-receiver already includes automatic gain control circuitry, the output signals of the rectifiers 51 and 52 may be obtained from this circuitry, so that the rectifiers 51 and 52 may be dispensed with.

The set of threshold circuits 71, 72 and 73 corresponds to the assembly 30 of FIG. 2. The outputs of the three threshold circuits are applied to the logic circuit 31. For convenience, logic circuit 31 will be referred to as the first logic circuit and logic circuit 27 will be referred to as the second logic circuit.

The first logic circuit 31 includes three bistables $B_1$, $B_2$ and $B_3$. The inputs of these three bistables form the inputs of the first logic circuit and bistables $B_1$, $B_2$ and $B_3$ are connected to threshold circuits 72, 73 and 71, respectively. Each bistable has an output *b* and a complementary output $\bar{b}$.

The first logic circuit 31 also includes four AND-gates $A_1$, $A_2$, $A_3$ and $A_0$. Each of these gates has four inputs. One input of each gate receives an authorization signal from the receiver section, as will be fully described below, and the other three inputs of each gate are connected as follows:

Gate $A_1$ is connected to bistable outputs $b_1$, $\bar{b}_2$ and $\bar{b}_3$; and gate $A_2$ is connected to bistable outputs $b_1$, $b_2$ and $\bar{b}_3$; gate $A_3$ is connected to bistable outputs $b_1$, $b_2$ and $b_3$; and gate $A_0$ is connected to bistable outputs $\bar{b}_1$, $\bar{b}_2$ and $\bar{b}_3$. The authorization signal on the other output of each gate is provided by the second logic circuit 27.

The bistables $B_1$, $B_2$ and $B_3$ are of the type having no memory facility, for example Schmidt triggers.

The assembly 19 includes four fixed frequency oscillators providing the frequencies $F_1$, $F_2$, $F_3$ and $F_0$. The output of each oscillator is connected to a first input of a respective AND-gate of a set of gates $a_1$, $a_2$, $a_3$ and $a_0$. Each of these gates has only two inputs, and the second inputs of gates $a_1$, $a_2$ and $a_3$ are connected to the outputs of gates $A_1$, $A_2$ and $A_3$, respectively. The output of gate $A_0$ is connected to a first input of a two-input OR-gate $Y_1$, whose output is connected to the second input of gate $A_0$. The second input of gate $Y_1$, which will be referred to as the first OR-gate, is connected to the output of a monostable 82 which is manually operable by means of a key 81. Thus the frequency $F_0$ can pass to the output of gate $a_0$ either in response to the appearance of "logical "one" at the output of gate $A_0$, or in response to operation of the monostable 82 by the key 81.

The monostable 82 supplies a pulse whose duration is of the order of 100 milliseconds. The function of this pulse is to ensure that the signal frequency $F_0$ is supplied at the beginning of a regulation process and to this end the key 81 is suitably ganged to the on/off switch of the transmitter section of the transmitter-receiver.

The second logic circuit 27 includes four bistables $B_4$, $B_5$, $B_6$ and $B_7$, whose inputs form the inputs of the second logic circuit and are connected to the outputs of the threshold circuits 74, 75, 76 and 77, respectively. Each bistable $B_4$ to $B_7$ has an output *b* and a complementary $\bar{b}$.

The second logic circuit 27 also includes four AND-gates $A_4$, $A_5$, $A_6$ and $A_7$ and a second OR-gate $Y_2$.

One input of each of gates $A_4$ to $A_7$ is connected to the output of a bistable $B_8$ whose input is connected to the output of a threshold circuit 102 whose threshold level is S'. The significance of this threshold circuit 102 is connected through a rectifier circuit 101 to the output of filter 25.

Each gate $A_4$ to $A_7$ has five inputs, and the remaining four are connected as follows:

Gate $A_4$ is connected to receive bistable outputs $b_4$, $\bar{b}_5$, $\bar{b}_6$ and $\bar{b}_7$; the remaining gates are similarly connected, that is to say each is connected to receive the output of the corresponding bistable and the complementary outputs $\bar{b}$ of the remaining bistables.

The outputs of the four gates $A_4$ to $A_7$ are connected to the four inputs of the second OR-gate $Y_2$. The output of the second OR-gate provides the authorization signal applied to gates $A_1$, $A_2$, $A_3$ and $A_0$ of the first logic circuit 31.

The switching element 28 includes three bistables $T_1$, $T_2$ and $T_3$. These bistables are of the type providing a memory facility and are controlled by transitions in the level of their input voltages. For this reason, the inputs of the three bistables $T_1$, $T_2$ and $T_3$ are connected to receive the outputs of gates $A_6$, $A_5$ and $A_4$, respectively, through respective differentiating circuits 85, 84 and 83. A further input of each bistable $T_1$ to $T_3$ receives the authorization signal from the second OR-gate $Y_2$.

When this authorization signal has the logic value "one", the bistables $T_1$ to $T_3$ can switch over in response to a control signal from the respective differentiating circuits 85 to 83. When this authorization signal has the logic value "zero", the bistables ignore changes in the output signals of the differentiating circuits. Once they have been fired by one or more control signals, the bistables $T_1$, $T_3$ are returned to zero for zero authorization signal.

The differentiating circuits 83, 84 and 85 are not of the "ideal" type providing very fine output pulses. They are of the so-called "imperfect" type which provide inclined pulse fronts of appreciable width, with noticeable pulse widths.

The outputs of bistables $T_1$, $T_2$ and $T_3$ are connected to respective resistances $R_1$, $R_2$ and $R_3$ to a common point Q. This point Q is grounded to a resistance R and is also connected through a direct current amplifier 86 with high input impedance to the control input W of variable attenuator 16. The resistance value of resistance $r$ is relatively low.

The network connected to the outputs of the bistables $T_1$ to $T_3$ forms a digital-to-analogue converter. The operation of this converter is as follows, taking as examples, a voltage of 10 volts for the logic value "one" at the bistable outputs and zero voltage for the logic value "zero", with the following resistance values: $r =$ 100 ohms; $r_1 =$ 10 kilohms; $r_2 =$ 5 kilohms; and $r_3 =$ 3.33 kilohms.

$t_1$, $t_2$ and $t_3$ represent the outputs of the respective bistables $T_1$ to $T_3$, and $V_Q$ represents the voltage at point Q. When $t_1 = t_2 = t_3 = 0$, $V_Q = 0$.

On reception of the frequency $F_1$, $t_1 = 1$ and $V_Q =$ 100 millivolts.

On reception of frequency $F_2$, $t_2 = 1$ and $V_Q =$ 200 millivolts.

On reception of frequency $F_3$, $t_3 = 1$ and $V_Q =$ 300 millivolts.

In the case of reception of frequency $F_1$ after reception of frequency $F_3$, $t_3 =$ and $t_1 = 1$ so that $V_Q =$ 400 millivolts. This illustrates the memory facility with the addition of further attenuation levels (corresponding to the increasing value $V_Q$) to a level already obtained, as previously mentioned.

The variable attenuator 16 provides no attenuation when $V_Q = 0$. For the successive values 100 millivolts, 200 millivolts and 300 millivolts of $V_Q$, attenuations of 10 dB, 20 dB and 30 dB are obtained. The attenuator is arranged to provide a further attenuation level, 40 dB in the present example, for a reason to be explained later.

While, as has been previously mentioned, the attenuator 16 is suitably one employing variable capacity diodes for alteration of the attenuation level, it will be appreciated that an attenuator may be used which includes discrete attenuator circuits each providing one of the required attenuation levels, the required level being selected by selecting the appropriate attenuator circuit. It would then be possible to dispense with the digital-to-analogue network as each attenuator circuit could be energized directly by the output of the corresponding bistable T.

The function and operation of the first logic circuit 31 are as follows:

A logic condition ($S_1$) is defined which has the logic value "zero" when the threshold $S_1$ is not exceeded (see FIG. 1) and logic value "one" when this threshold is exceeded. Similar logic conditions ($S_2$) and ($S_3$) are defined for thresholds $S_2$ and $S_3$.

Signal frequency $F_0$ is transmitted when no threshold has been exceeded. Frequency $F_1$ is transmitted when threshold $S_1$ only is exceeded. Frequency $F_2$ is transmitted when both thresholds $S_1$ and $S_2$ have been exceeded. Frequency $F_3$ is transmitted when all three thresholds $S_1$, $S_2$ and $S_3$ are exceeded.

These conditions are symbolized to the following table:

| F | $F_0$ | $F_1$ | $F_2$ | $F_3$ |
|---|---|---|---|---|
| ($S_1$) | 0 | 1 | 1 | 1 |
| ($S_2$) | 0 | 0 | 1 | 1 |
| ($S_3$) | 0 | 0 | 0 | 1 |

The logic conditions corresponding to the transmission of each frequency $F_0$ to $F_3$ are as follows:

$(F_0) = b_1 \cdot b_2 \cdot b_3$ $(F_1) = b_1 \cdot b_2 \cdot b_3$ $(F_2) = b_1 \cdot b_2 \cdot b_3$ $(F_3) = b_1 \cdot b_1 \cdot b_3$ These conditions are symbolized in the following table:

| F | $F_0$ | $F_1$ | $F_2$ | $F_3$ |
|---|---|---|---|---|
| $b_1$ | 0 | 1 | 1 | 1 |
| $b_2$ | 0 | 0 | 1 | 1 |
| $b_3$ | 0 | 0 | 0 | 1 |

The function and operation of the second logic circuit 27 is as follows:

One of the gates $A_4$ to $A_7$, for convenience referred to as gate $A_i$, must provide an output signal with the logic value "one" if,and only if, the output $b_i$ of bistable $B_i$ applies a logic "one" to it. This is ensured by the interconnection of the gates $A_4$ to $A_7$ with the bistables $B_4$ to $B_7$ as shown in FIG. 3.

When the bistable $B_8$ is energized to provide a logic "one" to one input of each gate $A_4$ to $A_7$, reception of one of the frequencies $F_1$, $F_2$, $F_3$ or $F_0$ provides an authorization signal at the output of the second OR-gate $Y_2$ with selection of an attenuation level for attenuator 16.

One example of the operation of the transmitter-receiver as a whole will now be given:

At the outset of a regulation process, post A transmits at its maximal level $P_A$ and transmits the signal frequency $F_0$. This is assured by the operation of the monostable 82.

Post B receives the transmission in range (3), as defined by FIG. 1. It will be appreciated that this reception level is taken purely by way of example and post B could equally well pick up the transmission from post A in any of the four ranges.

Post B transmits in turn at its own maximal level $P_B$. This level may be equal to the level $P_A$, but may equally well be different from it, due to accidental or deliberate differences between post A and post B. Post B transmits the signal frequency $F_3$.

Post A receives the transmission from post B in range (2). Since it receives signal frequency $F_3$, it reduces its transmission level by 30 dB to produce a new level of transmission $P_A - 30$ dB. Since it receives the transmission from post B in range (2), post A transmits the signal frequency $F_2$.

Post B receives the transmission from post A at the new level in range (0). It now transmits the signal frequency $F_0$. Since it receives the signal frequency $F_2$ from post A, it reduces its transmission level by 20 dB to provide a new transmission level of $P_B - 20$ dB.

Post A now receives the transmission from post B in range (0). It transmits the signal frequency $F_0$, and the transmission level $T_A - 30$ dB.

Post B receives the signal frequency $F_0$ and thus continues to transmit at the level $P_B - 20$ dB, transmitting the signal frequency $F_0$ also. Thus both posts are transmitting at transmission levels in the required lowest possible range.

If this stable configuration is disturbed, for example in the case of communications between mobile posts if the distance between them changes, the adjustments are carried out automatically in the required sense by a similar process, within the possible regulation limits of 40 dB.

FIG. 4 shows a number of regulation processes in tabular form.

The successive columns A and B correspond to posts A and B, respectively. Each of these columns consists of two halves: one half R denotes transmission (emission) by the same post.

In the tables, a number between brackets: (2), denotes one of the reception ranges shown in FIG. 1. $P_A$ and $P_B$ are the maximal transmission levels of posts A and B, respectively. $F_0$ to $F_3$ represent the signal frequencies.

The inclined arrows represent the logic connections between the receiver and transmitter sections of each transmitter-receiver. The horizontal arrows at the bottom of each table indicate coincidence of the signal frequency transmitted by one post and the signal frequency received by the other. The horizontal arrows at the top of each table represent the radio connection between the two posts.

With this symbolism, tables *a*, *b* and *c* are readily interpreted. To each received signal frequency corresponds the predetermined attenuation change, and to each level range received corresponds the transmission of the appropriate signal frequency. The end of each table corresponds to the stable position where each post transmits signal frequency $F_0$ and receives in the level range (0).

Tables *d* and *e* of FIG. 4 show two rather different processes.

If manufacturing tolerances, aging effects and the like are taken into account, it will be appreciated that it is impossible to make the reception level ranges (0), (1), (2) and (3) correspond exactly with the transmitter attenuation steps of zero, 10 dB, 20 dB and 30 dB.

Now, if the reception level raises are narrower than the attenuation steps, there is a risk, if an original level N is only slightly above one of the thresholds, $S_1$ to $S_3$, that the received level after regulation of the attenuation level passes below the reference value $N_0$ (see FIG. 1). In this case, a complete regulation cycle will be started with initial transmission at the maximal levels and so on. Evidently, this constitutes a waste of time and it is advantageous to minimize the number of regulation steps necessary. This is obtained by making the reception level ranges slightly wider than the attenuation steps, for example by one or two dB's. It is thus possible to remove risk of an untimely passage into the shaded zone below level $N_0$ of FIG. 1.

On the other hand, this creates the risk that with an original level N slightly below threshold, the received level after regulation of the attenuation does not fall within the required range (0), but stays for example in the range (1). This risk is, however, less inconvenient than the preceding one, since the required range will eventually be arrived at in any case, thanks to the accumulation of attenuation level changes.

Table *d* of FIG. 4 illustrates a process where, after reception in range (2) by post B, the correction of 20 dB in post A results in reception in post B not in the foreseen range (0), but in the range (1). Upon reception of the frequency $F_1$, post A adds 10 dB to its attenuation of 20 dB to provide a transmission level $T_A - 30$ dB, the definitive regulation.

Table *e* illustrates an analagous case, wherein post A undergoes a first correction of 30 dB which still produces in post B reception in range (1). Post A is then required to attenuate its transmission level by a further 10 dB, a total attenuation of 40 dB thus being required. This is the reason for the supplementary 10 dB attenuation available from attenuator 16 referred to above.

The overall duration of a complete regulation is of the order of some hundreds of milliseconds.

FIG. 5 is a graph in arbitrary units of reception level N against frequency F, a first curve $C_1$ corresponds to the intermediate frequency (IF) and a second curve $C_2$ corresponds to the radio frequency (RF).

An interference frequency Z is situated in a marginal region with respect to the pass band of the intermediate frequency. The transmission coefficient is $k_1$ in the intermediate frequency and $k_2$ in the radio frequency. The corresponding received levels are $k_1 \cdot Z$ (IF) and $k_2 \cdot Z$ (RF).

It is assumed that $k_1 \cdot Z$ lies between $S_1$ and $S_2$ and that $k_2 \cdot Z$ is greater than $S_3$.

From FIG. 3 it is seen that the logic conditions are: $b_1 = 1$, $b_3 = 1$. At the same time $b_2 = 0$ since the threshold $S_2$ has not been passed.

The result is that no signal frequency is transmitted in response to this interference frequency. This would not be the case if the three thresholds $S_1$, $S_2$ and $S_3$ were all taken in the intermediate frequency band, since one would then have the conditions: $b_1 = 1$, $b_2 = 0$, $b_3 = 0$. This would provide a meaningless transmission of the signal frequency $F_1$ in response to the interference frequency Z.

The graphs of FIG. 6 illustrate the protection against noise provided by the branch including bistable $B_8$, as shown in FIG. 3*b*.

Graph *a* of FIG. 6 shows the curve of filters 53, 54, 55 and 56, centered on the frequencies $F_0$, $F_1$, $F_2$ and $F_3$, respectively.

Graph *b* shows a noise signal whose distribution in the band is substantially uniform.

Graph *c* shows a noise level with high amplitude in the pass band of filter 54 centered on frequency $F_3$.

When the signal frequency $F_3$ is received in filter 54, a particular amplitude will be denoted *p* in arbitrary units.

Since the principle of the invention is to economize on the power transmitted, it is necessary to accept certain noise level in the received band of voice frequencies. The threshold S' of threshold circuit 102 (see FIG. 3) is adjusted to a value Q taking into account the received frequency signal, $F_3$ for example, and an acceptable noise level in the band 200 to 300 Hz. This noise level may correspond, for example, to a signal to noise ratio of 15 dB in the band of filter 54. If, in the absence of the signal frequency $F_3$, a "colored" noise component is present, as that shown in graph *c* of FIG. 6, it may be that the threshold S of threshold circuit 75 (see FIG. 3) is exceeded. However, since this pseudosignal is taken from the noise band, in these conditions it is not possible for the level *p* to reach the value Q and so exceed the threshold S' since there is not the addition of a component at the frequency $F_3$. On the contrary, there is extraction of the frequency $F_3$ in the noise band of filter 25, from 200–300 Hz. Consequently, the bistable $B_8$ provides at its output a logical "zero" and the second OR-gate clearly 2 gives no authorization signal.

Moreover, if an intense localized interference frequency appears in the band, for example, that shown at Z' in FIG. 6, it will generally provide an output from two adjacent filters, and this will prevent the provision of the authorization signal as is clearly seen from the wiring of the second logic circuit 27.

A transmitter-receiver,such as just described in the improved and detailed embodiment of FIG. 3, provides protection against interference by means of an RF threshold in combination with IF thresholds. It is thus possible to avoid an untimely triggering of a signal frequency by an intense radio frequency interference.

The transmitter-receiver also provides protection against noise and voice frequency interference by means of the authorization signal which prevents an untimely operation in response to a "colored" noise component incorrectly exciting one of the voice frequency thresholds.

Protection is also provided against intense voice frequency parasites liable to excite two selected filters simultaneously.

The mean speed of regulation is high, thanks to the use of reception level ranges which are slightly wider than the transmission attenuation steps, which permits the number of returns to zero of the attenuator to be minimized. The speed of regulation is made optimal by the process of accumulating changes in attenuation level rather than repeatedly returning to an initial condition.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed is:

1. A radio transmitter-receiver including a transmitter section and a receiver section, control means for adjusting the level of transmission of said transmitter section to another transmitter-receiver in accordance with one of a plurality of different level signals received from that other transmitter-receiver indicative of the level at which the transmission is received, said transmitter section including signalling means for transmitting to said other transmitter-receiver one of a plurality of different level signals comprising a selected one of a set of signal frequencies each significant of a preselected range of reception levels, said control means including filter circuit means for identifying the signal frequency of a received level signal and variable attenuator means responsive to the detection of a particular signal frequency for attenuating the transmission level of said transmitter section by a predetermined amount associated with that frequency, wherein said signalling means includes threshold circuit means connected to sample the instantaneous level at which the transmission from the other transmitterreceiver is received for providing an output significant of a preselected range in which the instantaneous level lies, and frequency selector means arranged to select an individual signal frequency for transmission to the other transmitter-receiver in accordance with the output of said threshold circuit means, said threshold circuit means having its input connected to the output of a radio frequency amplifier of the receiver section through a rectifying circuit and said frequency selector means including first logic circuit means connected to receive the output of said threshold circuit means for controlling operation of a switching unit for selecting said level frequency, said control means including second logic circuit means connected to receive the output of said filter circuit means which is connected to receive the level signal from the other transmitter-receiver via a band pass filter, said second logic circuit means providing an output applied to the variable attenuator to select the amount of attenuation associated with the identified signal frequency and including a respective first bistable circuit associated with each instantaneous level range and a first AND gate associated with each first bistable circuit, the outputs of said first AND gates being connected to respective inputs of a first OR gate providing at its output an authorization signal for said first logic circuit means.

2. A transmitter-receiver as claimed in claim 1, wherein said filter circuit means includes a filter for each signal frequency connected in series with a respective rectifier and threshold circuit to a respective input of said second logic circuit means, all threshold circuits having the same threshold value.

3. A transmitter-receiver as claimed in claim 1, wherein said frequency selector means includes a set of fixed frequency oscillators each providing one individual signal frequency through said switching unit to a modulator of the transmitter section.

4. A transmitter-receiver as claimed in claim 3 wherein the receiver section is a heterodyne receiver including a radio frequency amplifier and an intermediate frequency amplifier, part of said threshold circuit means being connected to receive the radio frequency amplifier output and the remainder being connected to receive the intermediate frequency amplifier output.

5. A transmitter-receiver as claimed in claim 4, wherein said threshold circuit means includes respective threshold circuits corresponding to each of a preselected set of reception levels.

6. A transmitter-receiver as claimed in claim 5, wherein selected threshold circuits are connected to receive the radio frequency amplifier output, the remainder of said threshold circuits being connected to receive the intermediate frequency amplifier output.

7. A transmitter-receiver as claimed in claim 6, wherein said signalling means includes signal generators providing a plurality of signal frequencies which lie in a narrow band at one end of a modulation band in which they are transmitted, the maximum depth of modulation employed for this transmission being 10%.

8. A transmitter-receiver as claimed in claim 7, wherein said transmitter section includes means for transmitting said signal frequencies in double modulation by means of an auxiliary sub-carrier, said signal frequencies being located at the upper end of the modulation band.

9. A transmitter-receiver as claimed in claim 8, wherein said first logic circuit means of said frequency selector means includes a respective second bistable circuit associated with each of the thresholds between adjacent instantaneous level ranges and a respective second AND-gate associated with each of the ranges, each second AND-gate being connected to receive selected second bistable circuit outputs and the set of second AND-gates providing the switching unit for selecting the level frequency.

10. A transmitter-receiver as claimed in claim 9, wherein the output of second AND-gate is connected to energize a respective fixed frequency oscillator.

11. A transmitter-receive as claimed in claim 10, including a manually operable device for selecting one of the signal frequencies.

12. A transmitter-receive as claimed in claim 11, wherein said manually operable device is a switch selectively connecting a voltage source to a second input of a first OR-gate whose other input is connected to the output of the second AND-gate corresponding to that one signal frequency, the second OR-gate output signal serving to select that one signal frequency either in response to operation of that second AND-gate or in response to operation of the switch.

13. A transmitter-receiver as claimed in claim 12, wherein each input of said second logic circuit means consists of the input of one of said first bistable circuits.

14. A transmitter-receiver as claimed in claim 13, including a noise discriminator circuit with an input connected in parallel with that of said filter circuit means and arranged to inhibit operation of said second logic circuit means in response to a predetermined noise level.

15. A transmitter-receiver as claimed in claim 14, wherein said noise discriminator circuit comprises a rectifier whose input constitutes the circuit input and whose output is connected to the input of each first AND-gate of said first logic circuit means.

16. A transmitter-receiver as claimed in claim 12, wherein said second logic circuit means includes means for controlling the operation of switching circuitry connected to receive the outputs of at least one of the first AND-gates of said second logic circuit means through respective differentiator circuits.

17. A transmitter-receiver as claimed in claim 16, wherein said switching circuitry includes three third bistable circuits each connected to receive a respective first AND-gate output through a respective differentiator circuit.

18. A transmitter-receiver as claimed in claim 17, wherein the third bistable circuit outputs are connected to the input of a digital-to analog converter whose output is applied via a direct current amplifier to said variable attenuator means.

19. A transmitter-receiver as claimed in claim 18, wherein the output of each third bistable circuit is connected to an individual attenuator circuit in said variable attenuator means.

20. A transmitter-receiver as claimed in claim 17, wherein each third bistable circuit is connected to receive said authorization signal so as to inhibit said third bistable circuits operating in response to said differentiator circuit outputs when the authorization signal is not present.

* * * * *